United States Patent Office 3,345,380
Patented Oct. 3, 1967

3,345,380
TRITHIONE PRODUCTION
Russell L. Hodgson, Walnut Creek, Calif., assignor to Shell Oil Company, New York, N.Y., a corporation of Delaware
No Drawing. Filed Mar. 29, 1965, Ser. No. 443,617
12 Claims. (Cl. 260—327)

ABSTRACT OF THE DISCLOSURE 1,2-dithiole-3-thiones (trithiones) are produced by a vapor-phase process which comprises intimately contacting olefins or paraffins of specified chain length with elemental sulfur at controlled reaction temperature.

---

This invention relates to an improved method of producing 1,2-dithiole-3-thiones.

Alternate methods are available in the art for producing 1,2-dithiole-3-thiones, herein termed trithiones. These compounds are heterocyclic in character, containing two adjacent atoms of sulfur and three carbon atoms in a five-membered, unsaturated ring. The simplest member of the family, trithione, is represented by the formula below:

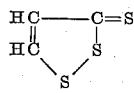

In general, conventional methods of producing trithiones comprise reacting certain unsaturated organic compounds such as propylene or substituted propylenes with sulfur or compounds capable of liberating sulfur, e.g., inorganic polysulfides, at temperatures of about 175° C.–225° C. For example, Luttringhaus et al. Ann., 560, 201 (1948), describe the reaction of propylene with sulfur at 175° C.– 220° C. to produce an approximately 1% yield of trithione. A similar process for the production of 5-(p-methoxyphenyl)trithione by reaction of anethole and sulfur is disclosed in U.S. 2,688,620 issued September 7, 1954, to Gaudin. In an alternate modification described by Beer et al., J. Chem. Soc., 4069 (1964), ethyl β,β-di-ethoxypropionate is reacted with phosphorus pentasulfide and sulfur in carbon disulfide solution at 135° C. to produce trithione. Taken as a whole, the methods of the art are characterized by low yields of product, particularly when the unsubstituted trithione is desired, and/or the requirement for economically expensive starting materials. It would be of advantage to provide a more efficient process for the production of trithione and derivatives, which process employs readily available starting materials.

It is an object of the present invention to provide an improved process for the production of certain 1,2-dithiole-3-thiones, i.e., trithiones. A more particular object is to provide an improved process for the production of trithiones by reaction of ethylenically unsaturated aliphatic hydrocarbons with sulfur. An additional object is to provide an improved process for the production of trithiones by reaction of saturated aliphatic hydrocarbons with sulfur. A specific object is to provide an improved process for reacting sulfur and propane or propylene to produce trithione.

It has now been found that these objects are accomplished by the process of reacting certain organic hydrocarbons possessing aliphatic moieties of three carbons in length with elemental sulfur in the vapor phase at a controlled reaction temperature. Under the controlled reaction conditions of the process of the invention, high yields of the desired trithione product are obtained.

The hydrocarbon reactant employed in the process of the invention has from 3 to 14 carbon atoms and comprises a non- to mono-ethylenically unsaturated three-carbon moiety wherein at least one terminal carbon atom of the three-carbon moiety possesses three hydrogen substituents, each carbon atom possesses no more than one non-hydrogen substituent and any non-hydrogen substituents on the three-carbon moiety are methyl, tert-butyl or phenyl, with the proviso that any phenyl substituent may connect two of the three-carbon moieties, and the hydrocarbon reactant as a whole contains no continuous aliphatic carbon chain of over three carbon atoms wherein each carbon atom possesses a hydrogen substituent.

When the hydrocarbon reactant is mono-ethylenically unsaturated, it contains a single ethylenic linkage, i.e., a non-aromatic carbon-carbon double bond, as the only non-aromatic carbon-carbon unsaturation present. Illustrative of such compounds are propylene, isobutylene, α-methylstyrene, propenylbenzene, 2,4,4-trimethyl-2-pentene and 2,3,3-trimethyl-1-butene. When the hydrocarbon is non-ethylenically unsaturated, it is free from ethylenic unsaturation and contains only the aromatic unsaturation of any phenyl substituents present as carbon-carbon unsaturation. Illustrative of such non-ethylenically unsaturated compounds are propane, isobutane, cumene, propylbenzene and 2,2,4-trimethylpentane. As previously stated, it is within the contemplated scope of the invention to employ difunctional hydrocarbon reactants wherein a phenyl moiety serves to connect two non- to mono-ethylenically unsaturated three-carbon moieties. Such compounds include dipropylbenzene, di-isopropylbenzene, dipropenylbenzene and diisopropenylbenzene. In general, however, monofunctional hydrocarbon reactants are preferred over analogous difunctional compounds.

Because the trithione product contains ethylenic unsaturation, it is generally preferred to employ a hydrocarbon reactant that is also ethylenically unsaturated, and mono-ethylenically unsaturated reactants are preferred over analogous non-ethylenically unsaturated materials, e.g., propylene is preferred over propane. Largely because of the availability thereof, propylene and isobutylene comprise a preferred class of mono-ethylenically unsaturated reactants, particularly propylene, and 2,2,4-trimethylpentene is also very satisfactory. Among the non-ethylenically unsaturated reactants, cumene is particularly suitable.

In the process of the invention, the hydrocarbon is reacted with elemental sulfur in the vapor phase at controlled elevated reaction temperature. Although the process is adaptable for a batch-type operation, the efficiency of the process allows short reaction times to be employed and the process is most suitably conducted in a continuous manner, as in a tubular flow reactor. In one modification, the hydrocarbon reactant and sulfur are mixed prior to or simultaneously with introduction into the reactor. In this modification, best results are obtained when the reactants have been preheated and are in the vapor phase at the time of mixing. It may also be desirable to employ an inert carrier gas such as nitrogen, argon, helium, steam or the like to facilitate passage of the reaction mixture through the reactor.

In an alternate modification, the sulfur is formed in situ as by reaction of hydrogen sulfide and sulfur dioxide. In this modification, a two-stage reactor is typically employed, the first stage of which is utilized for sulfur generation and the gaseous sulfur therein produced is passed to the second stage wherein it is contacted with the hydrocarbon reactant to effect the desired thithione producion. In this modification, hydrogen sulfide and sulfur dioxide are introduced into the initial reactor stage which is preferably packed with an inert material, e.g., alumina, silica, crushed brick, glass helices or the like, to promote a more even heat transfer and provide surface. The gaseous reactants are maintained at an elevated temperature, e.g., from about 400° C. to about 450° C., during passage through the sulfur generation zone to promote a more rapid rate of sulfur formation and to maintain the sulfur product in the vapor phase. In such an in situ production of sulfur, the hydrogen sulfide and sulfur dioxide are employed in any convenient ratio. No apparent advantage is gained by the utilization of other than stoichiometric amounts, and the use of substantially stoichiometric proportions, i.e., a molar ratio of hydrogen sulfide to sulfur dioxide of about 2:1, is preferred. The in situ production of sulfur is conducted at any convenient pressure and pressures from about 0.5 atmosphere to about 5 atmospheres are satisfactory. As previously stated, the effluent from the initial reaction zone wherein sulfur is produced is suitably passed directly to a second reaction zone wherein the sulfur is to be contacted with the hydrocarbon reactant. It should be appreciated that in the in situ formation of sulfur as is described above, water is also formed as a product. The presence of water in the reaction zone wherein sulfur and the hydrocarbon reactant are contacted does not appear to be detrimental and it is not necessary to remove the water from the initial reaction zone effluent before contacting the effluent with the hydrocarbon reactant.

Largely because of the availability of elemental sulfur and the low cost thereof, the modification wherein sulfur is employed directly is preferred over the modification wherein sulfur is produced in situ.

Regardless of the manner of sulphur provision, it is generally preferred to employ an excess of the sulfur during the reaction with hydrocarbon to produce the trithione product in order to facilitate more extensive hydrocarbon conversion. The optimum amount of sulfur to be employed will in part depend upon the functionality of the hydrocarbon reactant, that is, whether one or two three-carbon non- to mono-ethylenically unsaturated moieties are present, as well as the type of three-carbon moiety present in the hydrocarbon reactant, i.e., whether the three-carbon moiety (moieties) is (are) non-ethylenically unsaturated or mono-ethylenically unsaturated. A stoichiometric consideration of the reaction would predict the necessity for 5 gram-atoms of sulfur for each mole of mono-ethylenically unsaturated three-carbon moiety and 6 gram-atoms of sulfur for each mole of non-ethylenically unsaturated three-carbon moiety. However, it is on occasion desirable to employ ratios of gram-atoms of sulfur to moles of non- to mono-ethylenically unsaturated three-carbon moiety as low as about 2:1 or as high as about 12:1. Ratios of gram-atoms of sulfur to moles of non- to mono-ethylenically unsaturated three-carbon moiety of from about 3:1 to about 10:1 are preferred. It is also, on occasion, desirable to employ an inert carrier gas such as nitrogen, argon, helium, steam or the like to facilitate passage of the reaction mixture through the reactor.

The temperature at which the sulfur and hydrocarbon reactant are reacted has been found to be critical when good yields of trithione product are desired. The use of a reaction temperature that is too low results in an unnecessarily low conversion of hydrocarbon reactant and consequent low yields of trithione product. Alternatively, however, the use of a reaction temperature that is too high results in a diminution of selectivity to trithione product which is not compensated by the increased conversion obtained, so that the yield of the desired trithione product is effectively decreased. An optimum yield of trithione product is obtained, however, when a reaction temperature from about 450° C. to about 575° C. is employed and employing otherwise identical reaction conditions, the use of such reaction temperatures results in a higher yield of trithione product than when either higher or lower reaction temperatures are employed. For particularly satisfactory results, the utilization of reaction temperatures from about 475° C. to about 550° C. is preferred.

The efficiency of the present process is not dependent upon utilization of any particular reaction pressure, except in so far as the pressure under which the gaseous reactants are introduced to the reaction zone will influence the residence time and hence the reactant contact time in a reaction zone of any given volume. Little advantage is obtained by employing pressures other than about atmospheric pressure and the reaction is preferably conducted at a pressure that is substantially atmospheric, that is, a pressure of from about 0.5 atmosphere to about 5 atmospheres. Utilizing such pressures, reactant contact times of from about 0.5 second to about 8 seconds are obtainable in a reaction zone of moderate size and such reactant contact times are satisfactory. Preferred, however, are reactant contact times of from about 1 second to about 5 seconds.

Subsequent to reaction, the effluent from the reaction zone is customarily at least partially condensed to provide a product mixture from which the desired trithione product is separated and recovered by conventional means such as fractional distillation, fractional crystallization, selective extraction or the like.

The trithione products of the process of the invention comprise a five-membered unsaturated heterocyclic ring containing two adjacent atoms of sulfur and containing as ring substituents any substituent groups originally present on the non- to mono-ethylenically unsaturated three-carbon moiety. Illustrative products include trithione from propylene or propane, 4-methyltrithione from isobutylene or isobutane, 4-methyl-5-tert-butyltrithione from 2,4,4-trimethyl-2-pentene, 4-phenyltrithione from α-methylstyrene or cumene, and 4,4'-(1,4-phenylene)ditrithione from 1,4-diisopropenylbenzene.

The trithione products of the invention find utility as chemical intermediates, particularly in the production of agricultural and medicinal products, and are also useful as antioxidants, corrosion inhibitors and extreme pressure additives.

To further illustrate the improved process of the invention, the following examples are provided. It should be understood that the details thereof are not to be regarded as limitations, as they may be varied as will be understood by one skilled in this art.

*Example 1*

A series of experiments was conducted wherein propylene was reacted with sulfur to produce trithione. The apparatus employed was a two-stage vycor reactor of approximately 100 ml. volume in each stage. The stages were thermally independent and each was heated in a vertically-mounted furnace. To the first stage which contained Porocel packing and was maintained at 400° C. was hydrogen sulfide at the rate of 420 cc./min. and sulfur dioxide at the rate of 210 cc./min. The sulfur vapor from the first stage was passed to the second stage wherein it was contacted with propylene introduced at the rate of 125 cc./min. and diluent nitrogen introduced at the rate of 200 cc./min. Assuming complete conversion to sulfur in the initial stage, the ratio of gram-atoms of sulfur to moles of propylene was 5, and the residence time was 2–3 seconds. The effluent from the second stage was passed to an unheated trap where most of the trithione was collected. The trithione carried over by the gas stream was recovered by scrubbing with benzene which was then removed by distillation under reduced pressure. The combined trap and scrubber products were distilled at 110° C. at 0.1–1 mm. When desired, the trithione product was further purified by crystallization from 4:1 cyclohexane-benzene.

The results of a series of experiments conducted in this manner but varying the temperature at which sulfur and propylene reacted are shown in Table I, wherein the yield of trithione is based on propylene charged, and the selectivity is based on total observed products.

TABLE I

| Temperature, ° C | 375 | 400 | 425 | 450 | 475 | 500 | 525 | 550 | 600 |
|---|---|---|---|---|---|---|---|---|---|
| $C_3H_6$ Feed, millimoles | 970 | 943 | 843 | 973 | 943 | 1,020 | 2,200 | 1,718 | 919 |
| Products, millimoles: | | | | | | | | | |
| $C_3H_6$ | 832 | 776 | 642 | 623 | 442 | 336 | 572 | 334 | 164 |
| $CS_2$ | 0 | 0 | 0 | 8 | 11 | 10 | 63 | 56 | 66 |
| $C_3H_2S_3$ | 57 | 82 | 146 | 274 | 379 | 531 | 1,040 | 957 | 374 |
| Bottoms | 52 | 52 | 54 | 89 | 115 | 116 | 343 | 253 | 161 |
| Coke | 0 | 0 | 1 | 0.6 | 1 | 1 | 9 | 5 | 8 |
| Yield, percent | 6 | 9 | 17 | 28 | 40 | 52 | 50 | 56 | 41 |
| Conversion, percent | 11 | 14 | 24 | 38 | 54 | 65 | 69 | 74 | 66 |
| Selectivity, percent | 52 | 61 | 73 | 74 | 75 | 81 | 72 | 75 | 61 |

*Example II*

A series of experiments was conducted in a similar but unpacked two-stage reactor. Molten elemental sulfur together with nitrogen carrier gas was introduced into the first stage maintained at 400° C. where the sulfur was vaporized. The gaseous effluent from this stage was passed to the second stage where it was mixed with preheated propylene and additional nitrogen. The effluent from the second stage was separated in a manner similar to that of Example I. The results of this series are shown in Table II wherein the yield is yield of trithione based upon propylene charged and the selectivity is selectivity to trithione based on total observed products.

TABLE II

| Temperature, ° C | 475 | 475 | 500 | 515 | 550 |
|---|---|---|---|---|---|
| Residence time, sec | 2.5 | 2.3 | 1.2 | 2.4 | 2.2 |
| Feed, millimoles: | | | | | |
| $C_3H_6$ | 907 | 415 | 1,810 | 919 | 651 |
| S | 2,930 | 3,750 | 5,140 | 2,420 | 3,530 |
| Products, millimoles: | | | | | |
| $C_3H_6$ | 460 | 235 | 1,440 | 503 | 58 |
| $CS_2$ | 7 | 5 | 0 | 7 | 22 |
| $C_3H_2S_3$ | 276 | 160 | 378 | 373 | 469 |
| Bottoms | 72 | 54 | 118 | 70 | 80 |
| Coke | 1.7 | 2.0 | 1.3 | 1.2 | 1.6 |
| Yield, percent | 30 | 39 | 21 | 41 | 72 |
| Conversion of $C_3H_6$, percent | 39 | 53 | 27 | 49 | 88 |
| Selectivity, percent | 78 | 72 | 76 | 83 | 82 |

*Example III*

The procedure of Example II was repeated using a reaction temperature of 550° C., a residence time of 2-3 sec., and various other hydrocarbon reactants. The results of these experiments is shown in Table III wherein the yield is yield of corresponding trithione product based on the hydrocarbon charged and selectivity is selectivity to the corresponding trithione product based on total products.

TABLE III

| Hydrocarbon | Propane | Isobutane | α-Methylstyrene | Cumene |
|---|---|---|---|---|
| Feed, millimoles: | | | | |
| Hydrocarbon | 900 | 820 | 820 | 700 |
| Sulfur | 4,850 | 4,550 | 4,700 | 3,760 |
| Products, millimoles: | | | | |
| Hydrocarbon | 736 | 466 | 39-60 | 246 |
| $CS_2$ | 55 | 46 | 41 | 28 |
| Corresponding Trithione | 137 | 241 | 600 | 390 |
| Bottoms | 71 | 66 | 75 | 35 |
| Coke | 1 | 5 | 0.4 | 0.3 |
| Yield, percent | 15 | 29 | 73 | 56 |
| Conversion, percent | 29 | 44 | 91 | 65 |
| Selectivity, percent | 52 | 67 | 81 | 86 |

*Example IV*

Following the procedure of Example II, a series of experiments was conducted employing isobutylene in place of the propylene of that example and a residence time of 2-3 seconds. The results are shown in Table IV wherein yield is yield of 4-methyltrithione based upon isobutylene charged and the selectivity is selectivity to 4-methyltrithione based on total products.

TABLE IV

| Temperature, ° C | 350 | 450 | 500 | 550 | 550 | 600 |
|---|---|---|---|---|---|---|
| Feed, millimoles: | | | | | | |
| i-$C_4H_8$ | 934 | 995 | 958 | 882 | 216 | 941 |
| S | 3,540 | 3,740 | 3,550 | 3,210 | 1,170 | 3,480 |
| Product, millimoles: | | | | | | |
| i-$C_4H_8$ | 832 | 593 | 272 | 262 | 27 | 571 |
| $CS_2$ | 0 | 0 | 6 | 15 | 7 | 37 |
| $C_4H_4S_3$ | 53 | 380 | 530 | 460 | 139 | 383 |
| Bottoms | 13 | 37 | 75 | 69 | 35 | 110 |
| Coke | 0 | 2 | 5 | 10 | 4 | 11 |
| Yield, percent | 6 | 38 | 55 | 52 | 64 | 41 |
| Conversion, percent | 7 | 42 | 64 | 63 | 86 | 58 |
| Selectivity, percent | 80 | 91 | 86 | 83 | 75 | 71 |

*Example V*

Following the procedure of Example IV, experiments were conducted employing disubstituted benzene compounds in place of the isobutylene reactant. The reaction temperature in each case was approximately 550° C. and the residence time was 2-3 seconds. The results are shown in Table V wherein the reported yields are based upon the charged hydrocarbon feed. The term "ditrithione" employed in the table refers to 4,4'-(1,4-phenylene)-ditrithione, produced from either reactant, which is believed to be a novel compound. The term "monotrithione" refers to the product produced by reaction of only one of the two benzene substituents to form a trithione derivative. Each mono product is also believed to be novel.

TABLE V

| Hydrocarbon | p-Diisopropyl-benzene | p-Diisopropenyl-benzene |
|---|---|---|
| Feed, millimoles: | | |
| Sulfur | 5,160 | 2,640 |
| Hydrocarbon | 418 | 230 |
| Products, millimoles: | | |
| Ditrithione | 85 | 84 |
| Monotrithione | 70 | 47 |
| Coke | 28 | 58 |
| $CS_2$ | 10 | 15 |
| Yield, percent: | | |
| Ditrithione | 20 | 37 |
| Monotrithione | 17 | 20 |
| Coke | 7 | 25 |
| $CS_2$ | 2 | 6 |

The products of the above experiments were separated by fractional crystallization and identified by elemental analysis, by ultra violet and nuclear magnetic resonance spectra and by mass spectrographic analysis.

*Example VI*

Following the procedure of Example IV, an experiment was conducted utilizing β-methylstyrene as the hydrocarbon reactant. The reaction temperature was 550° C. and the residence time was approximately 2 seconds. The results are shown in Table VI wherein the yield is based on the charged hydrocarbon feed and the selectivity is based upon total products.

TABLE VI

Feed, millimoles:
- β-methylstyrene _____ 1140
- Sulfur _____ 5550

Products, millimoles:
- $CS_2$ _____ 60
- 5-phenyltrithione _____ 438
- Bottoms _____ 177
- Coke _____ 6

Yield, percent _____ 42

Selectivity, percent:
- 5-phenyltrithione _____ 57
- $CS_2$ _____ 7
- Bottoms _____ 21
- Coke _____ 0.7

*Example VII*

Following the procedure of Example VI, an experiment was conducted employing diisobutylene as the hydrocarbon feed. The residence time was approximately 2 seconds and the reaction temperature was 500° C. The results are shown in Table VII wherein the yield is total yield of trithiones based upon the charged hydrocarbon feed and the selectivity is based upon total products.

TABLE VII

Feed, millimoles:
- Diisobutylene _____ 1160
- Sulfur _____ 6820

Products, millimoles:
- Diisobutylene _____ 162
- $C_4H_8$ _____ 31
- $CS_2$ _____ 16
- 4-neopentyltrithione _____ 200
- 4-methyl-5-tert-butyltrithione _____ 238
- 4-methyltrithione _____ 119
- Coke _____ 5

Yield, percent _____ 48
Conversion, percent _____ 64

Selectivity, percent:
- 4-neopentyltrithione _____ 27
- 4-methyl-5-tert-butyltrithione _____ 32
- 4-methyltrithione _____ 16
- Total trithiones _____ 75
- $C_4H_8$ _____ 4
- $CS_2$ _____ 2
- Coke _____ 0.7

I claim as my invention:

1. The process of producing a trithione product by intimately contacting
   (a) a hydrocarbon of from 3 to 14 carbon atoms comprising a non- to mono-ethylenically unsaturated three-carbon moiety wherein at least one terminal carbon atom of said three-carbon moiety possesses three hydrogen substituents, each carbon atom of said three-carbon moiety possesses no more than one non-hydrogen substituent with the proviso that any phenyl substituent may connect two such three-carbon moieties, said hydrocarbon containing no continuous aliphatic carbon atom chain of over three carbon atoms wherein each carbon atom possesess a hydrogen substituent; with
   (b) from about 2 gram-atoms to about 12 gram-atoms of sulfur per mole of said three-carbon moiety;
   (c) in the vapor phase, at a temperature of from about 450° C. to about 575° C., and a pressure of from about 0.5 atmosphere to about 5 atmospheres, the contact time of said hydrocarbon and said sulfur being from about 0.5 second to about 8 seconds.

2. The process of producing a trithione product by intimately contacting
   (a) a hydrocarbon of from 3 to 14 carbon atoms comprising a non- to mono-ethylenically unsaturated three-carbon moiety wherein at least one terminal carbon atom of said three-carbon moiety possesses three hydrogen substitutents, each carbon atom of said three-carbon moiety possesses no more than one non-hydrogen substituent and any non-hydrogen subtituents are selected from the group consisting of methyl, tert-butyl and phenyl, said hydrocarbon containing no continuous aliphatic carbon atom chain of over three carbon atoms wherein each carbon atom possesses a hydrogen substituent; with
   (b) from about 2 gram-atoms to about 12 gram-atoms of sulfur per mole of said hydrocarbon compound;
   (c) in the vapor phase, at a temperature of from about 450° C. to about 575° C., and a pressure of from about 0.5 atmosphere to about 5 atmospheres, the contact time of said hydrocarbon and said sulfur being from about 0.5 second to about 8 seconds.

3. The process of claim 2 wherein the hydrocarbon is monoethylenically unsaturated.

4. The process of claim 3 wherein the hydrocarbon is propylene.

5. The process of claim 3 wherein the hydrocarbon is isobutylene.

6. The process of claim 3 wherein the hydrocarbon is α-methylstyrene.

7. The process of claim 3 wherein the hydrocarbon is diisobutylene.

8. The process of claim 2 wherein the hydrocarbon is nonethylenically unsaturated.

9. The process of claim 8 wherein the hydrocarbon is propane.

10. The process of claim 8 wherein the hydrocarbon is isobutane.

11. The process of claim 8 wherein the hydrocarbon is cumene.

12. The process of producing a trithione compound by intimately contacting
    (a) a hydrocarbon selected from the group consisting of propylene and isobutylene; with
    (b) from about 3 gram-atoms to about 10 gram-atoms of sulfur per mole of said hydrocarbon;
    (c) in the vapor phase at a temperature of from about 475° C. to about 550° C., and a pressure of from about 0.5 atmosphere to about 5 atmospheres,
    (d) the contact time of said hydrocarbon and said sulfur being from about 0.5 second to about 8 seconds.

(References on following page)

References Cited

UNITED STATES PATENTS

| | | | |
|---|---|---|---|
| 2,653,910 | 9/1953 | Airs et al. | 260—327 |
| 2,905,696 | 9/1959 | Fields | 260—327 |
| 2,995,569 | 8/1961 | Hamilton et al. | 260—327 |

OTHER REFERENCES

Lozach Industrie Chimique Belge, vol. 26, #9 (1961), pp. 1130–2.

JOHN D. RANDOLPH, *Primary Examiner.*

J. PATTEN, *Examiner.*